United States Patent [19]

Baston

[11] 4,359,005
[45] Nov. 16, 1982

[54] FLUIDIZED BED INCINERATION OF WASTE

[75] Inventor: Virgil F. Baston, Idaho Falls, Id.

[73] Assignee: Energy Incorporated, Idaho Falls, Id.

[21] Appl. No.: 290,050

[22] Filed: Aug. 5, 1981

Related U.S. Application Data

[63] Continuation of Ser. No. 51,777, Jun. 25, 1979, abandoned.

[51] Int. Cl.$^3$ .................... F23G 7/00; F23B 7/00; G05D 11/00; F27B 15/08
[52] U.S. Cl. .................... 110/245; 110/237; 110/343; 110/346; 110/347; 422/105; 422/109; 422/111; 422/144; 422/145; 422/146
[58] Field of Search ............... 110/244, 216, 233, 243, 110/245, 342, 343, 346, 347, 264, 237; 422/144, 145, 146, 105, 109, 111

[56] References Cited

U.S. PATENT DOCUMENTS

| | | | |
|---|---|---|---|
| 3,556,024 | 1/1971 | Fuller et al. | 110/346 |
| 3,625,164 | 12/1971 | Spector | 110/342 |
| 3,807,090 | 4/1974 | Moss | 48/128 |
| 3,834,326 | 9/1974 | Sowards | 110/243 |
| 4,060,041 | 11/1977 | Sowards | 110/264 X |
| 4,075,953 | 2/1978 | Sowards | 110/245 |
| 4,102,277 | 7/1978 | Wall | 110/342 |

OTHER PUBLICATIONS

Ziegler et al., "Fluidized Bed Incineration of Transuranic Contaminated Waste", Report 1976 RFP-2693.

Primary Examiner—Barry S. Richman
Attorney, Agent, or Firm—Lynn G. Foster

[57] ABSTRACT

Apparatus and methods for fluidized bed incineration of waste containing phosphorus wherein the bed comprises lime or limestone which negates heretofore existing problems incident to the presence of phosphorus.

2 Claims, 1 Drawing Figure

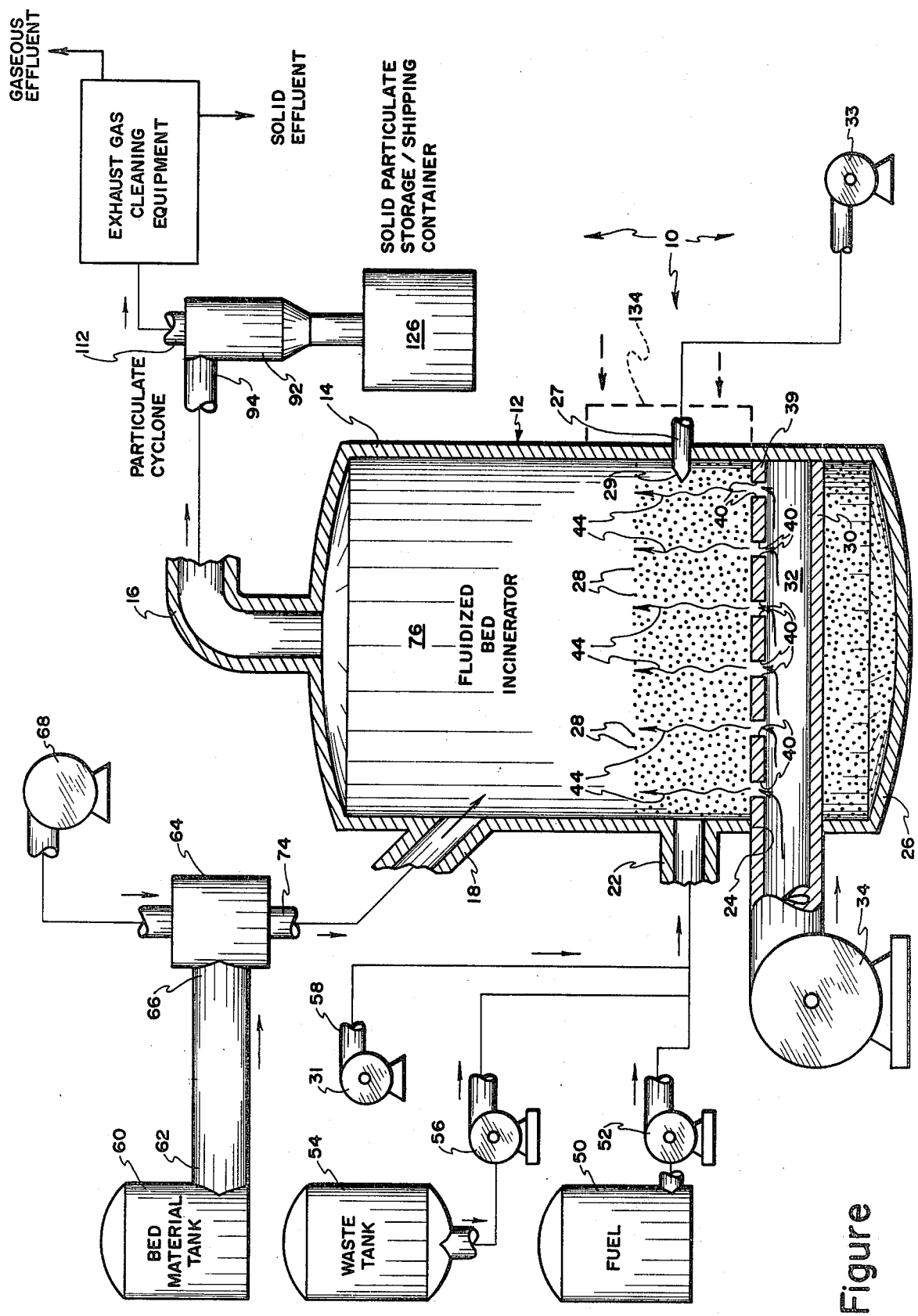

4,359,005

FLUIDIZED BED INCINERATION OF WASTE

CONTINUITY

This application is a continuation of my copending U.S. patent application Ser. No. 51,777, filed June 25, 1979 now abandoned.

BACKGROUND

1. Field of Invention

The present invention relates broadly to incineration of wastes and more particularly to fluidized bed incineration of waste containing phosphorus using a bed material which negates the previously existing harmful effects of phosphorus.

2. Prior Art

Special purpose fluidized bed apparatus and methods are known. For example, U.S. Pat. Nos. 3,834,326; 4,060,041 and 4,075,953 respectively deal with incineration of solid wastes, principally those obtained from saw mills and the like. In particular, the last two mentioned U.S. Patents deal with customizing the bed material of the fluidized bed to comprise olivine whereby certain improved results may be obtained.

Furthermore, the unique problems incident to removal of sulfur from fuels using lime are treated by U.S. Pat. Nos. 3,625,164 and 3,807,090.

Notwithstanding the foregoing, until the present invention no solution has been proposed for negating the deleterious side effects encountered in conventional fluidized bed incineration of wastes containing phosphorus, i.e. (a) formation of highly corrosive phosphoric acid within the fluidized bed vessel, (b) formation of a hard glass-like slag or scale material which tends to adhere to the walls of gas flow passageways and heat transfer surfaces within the apparatus causing a marked reduction in efficiency, and (c) formation of liquid by-products which adhere to the particles of conventional bed materials destroying the needed fluidization qualities.

The deleterious side effects limit the effectiveness of certain exhaust gas cleaning equipment due to corrosion or plugging which can result in the release of harmful materials to the atmosphere.

BRIEF SUMMARY AND OBJECTS OF THE PRESENT INVENTION

The present invention solves or greatly alleviates the above-mentioned problems and, in brief summary, comprises fluidized bed incineration of wastes containing phosphorus using lime or limestone as a bed ingredient, calcium phosphate being thereby formed, which is dry, solid and stable and can be readily removed from the unreacted bed material.

Accordingly, it is a primary object of the present invention to provide novel apparatus and methods for effective fluidized bed incineration of solid, liquid or gaseous waste containing phosphorus.

A further important object of the present invention is the utilization of a fluidized bed comprising calcium as CaO or $CaCO_3$ to avoid or substantially alleviate problems otherwise incident to fluidized bed treatment of waste containing phosphorus.

A further significant object according to the present invention is the provision of novel apparatus and methods for fluidized bed treatment of waste containing phosphorus wherein solid, dry, stable, calcium phosphate is derived.

A specific object is the fluidized bed incineration of radioactive wastes containing tributyl phosphate whereby the potential harmful effects of the tributyl phosphate are chemically negated.

These and other objects and features of the present invention will be apparent from the following detailed description taken in reference to the accompanying drawings.

BRIEF DESCRIPTION OF THE DRAWINGS

The FIGURE schematically illustrates one presently preferred fluidized bed incinerator system by which fuel and waste materials containing phosphorus material are disposed of while problems ordinarily incident to the presence of phosphorus are avoided or substantially alleviated.

DETAILED DESCRIPTION OF THE ILLUSTRATED EMBODIMENT

Reference is now made to the FIGURE which illustrates a presently preferred fluidized bed incinerator system, generally designated 10, in accordance with the present invention. More specifically, the system 10 comprises a fluidized bed incinerator, generally designated 12. Incinerator 12 comprises a closed vessel 14. Access to and from the interior of the vessel 14 is provided at gas air delivery duct opening 24, which is illustrated as being disposed immediately above the floor 26 of the vessel 14 and compressed air duct 27 for operation of jet grinder 29.

Opening 24 accommodates passage of air to an air delivery plenum or duct system 30 at the bottom of the vessel 14, the hollow interior 32 of the duct system 30 accommodating a relatively large volume of air under pressure to reach the interior of the vessel 14 by upward percolation through a bed 28 disposed immediately above the duct 30. Air for the hollow 32 of the duct system 30 is supplied from a compressor or blower 34.

Air is issued from the hollow 32 of the duct 30 through a series or an array of apertures or perforations in the grid plate 39, air escaping under pressure through the bed 28 as indicated by arrows 44.

Fuel is directly injected and dispersed in the bed from a fuel source 50, under force created by pump 52, the fuel being mixed with waste material containing phosphorus displaced from tank 54 by pump 56 prior to injection. Further, air supplied through conduit 58 from compressor 31 is comingled with the waste and fuel such that the air-fuel-waste mixture injected and substantially uniformly dispersed into the bed 28 through the port 22 is appropriately proportioned to provoke efficient incineration of the waste and fuel within the bed. Depending upon the nature of the waste and fuel selected for utilization, screw conveyors or other suitable and available devices may be used in lieu of pumps 52 and 56 and blowers 31 to convey waste and fuel to the bed.

The bed material comprises for example, CaO or $CaCO_3$, which reacts with phosphorus forming an inert solid dry calcium phosphate, which can be easily disposed of. More particularly, the bed material is granular and may be selected from the group consisting of calcium oxide [CaO], limestone [$CaCO_3$] and/or slaked lime [$Ca(OH)_2$]. The slaked lime decomposes to lime [CaO] when subjected to the incineration temperatures reached with the vessel 14 at bed 28. The limestone may also decompose to CaO when the incineration temperatures are sufficiently high. Therefore, regardless of the starting material, the bed 28 is comprised of calcium oxide at the time of the reaction. It is presently preferred that the entire bed consist of lime and/or limestone and/or slaked lime, although various mixtures of said calcium oxide producing materials with other known and available fluidized bed materials may be used.

Because of the existence of phosphorus in the waste introduced into the bed 28, it is necessary to replenish the material comprising bed 28 either on a metered continuous basis or a metered periodic basis. The bed material is preferably dispensed by a conventional volumetric screw feeder 62.

Since the bed material is a granular material, when introduced from a source 60 by screw feeder 62 into the eductor 64 at port 66, it is dispersed within and carried by air under pressure emanating from compressor or blower 68. Effluent air issues from eductor 64 through conduit 74 and, under force of the mentioned air pressure, is thereafter introduced at port 18 into the interior of the vessel 14. The natural motion of the bed homogenously mixes incoming bed material into the bed 28. The air entering port 18 may aid and assist in the combustion or incineration process occuring within the vessel 14 and, to the extent not used in the oxidation process is discharged from the vessel 14 at the gas effluent duct 16.

It is immaterial whether or not the screw feeder 62 operates continuously to supply a quantity of bed material to the bed 28 consistent with the rate at which the material is being consummed or if the bed material is periodically replenished, so long as the bed 28 is able to continue to promote efficient incineration of the waste and chemically neutralize the phosphorus contained within the waste by reaction with lime and/or limestone and/or slaked lime to form calcium phosphate.

Air under pressure issuing from perforations 40 in grid plate 39 continuously elutriates calcium phosphate as dust from the bed and carries all gaseous and solid products of incineration into the vapor space or zone 76 of the vessel 14.

One or more jet grinders 29 may be used to increase the attrition rate of the bed particles thereby promoting the separation of calcium phosphate from the bed. After the fine particles are removed from the surface of the larger bed particles by the jet grinder, they are elutriated from the vessel. The jet grinder 29 creates a high velocity air stream which impinges on the bed. High pressure air is supplied to the jet grinder orifice 27 by compressor 33.

It is to be appreciated that the calcium phosphate may be removed from the bed 28 in any suitable fashion, elutriation being presently preferred; however, available bed drain systems and overflow systems may be utilized, if desired.

Exhaust from the vapor zone 76 is discharged through duct 16 and delivered to particulate cyclone 92, the gases being introduced into cyclone 92 through elevated side port 94.

The solid particulate is separated from the gas phase within the cyclone 92.

Any solid materials including calcium phosphate caused to be separated from the gas phase within the cyclone 92 are delivered to storage canister 126.

The gas phase effluent is issued from cyclone 92 through its elevated duct 112 and is either exhausted to the atmosphere or processed in additional gas cleaning equipment.

It should be readily apparent that cyclone 92, together with any additional gas cleaning equipment desired cause the system 10, to function efficiently and ensure that the exhaust issued to the atmosphere meets all control standards.

While not shown, depending upon materials utilized, the exhaust may be processed through various conventionally available mechanisms for the purpose of further purification, including but not limited to filters, adsorbers, scrubbers, etc.

Furthermore, in order to regulate the upper limits of the temperature within the vessel 14 and more particularly within the bed 28, a heat exchanger 134 may be utilized and in this way the rate at which waste material is incinerated may be increased without exceeding the maximum operating temperature or increasing the size of the incinerator.

Vessel temperature control can also be attained by state of the art regulation of the incoming air, fuel and waste and/or by use of water injection into the vessel.

Secondary air may be used to improve fuel combustion within the vessel 14 if desired or to control the interior temperatures generated within the vessel 14 in order that substantially all waste and fuel are incinerated without allowing the temperature to exceed the melting point of calcium phosphate. Heat exchanger 134 may also be used together with control of influent air into the vessel 14 to ensure that efficient incineration occurs without temperatures in excess of the melting point of calcium phosphate.

In use, the system 10 is designed and adapted to treat solid, slurry, liquid and gaseous wastes which contain phosphorus in such a fashion that prior harmful side effects are negated. The waste is efficiently incinerated all control standards are satisfied.

The phosphorus bearing materials that may be satisfactorily processed in this invention must be a material that would form either phosphorus oxides or phosphoric acid duing combustion in absence of a chemical neutralizing material such as calcium oxide. Many chemicals containing phosphorus are stable at combustion temperatures and would not react with a calcium based bed material to form calcium phosphate. For example, both sodium phosphate and potassium phosphate are stable at normal combustion temperatures. Of the phosphorus bearing materials that can be processed by this invention, tributyl phosphate, or any combustible process stream containing elemental phosphorus or phosphorus compounds as containments.

One example of the manner in which this invention may be used is in treatment of organic wastes contaminated with radioactivity. The incineration system 10 is particularly useful in treating organic solvent waste streams containing phosphorus material which issue from fuel reprocessing facilities for nuclear reactors. Under these circumstances, the radioactive hazards incident to disposition or radioactive wastes together with pollution control standards promulgated by the Environmental Protection Agency and other governmental agencies are of primary concern.

Nuclear fuel reprocessing commonly uses a solvent extraction process to extract uranium and plutonium from an aqueous solution of fission products. While the solvent is reused, a fraction thereof is degraded and must be disposed of. The solvent is combustible, comprising tributyl phosphate and diluent. In the past, the solvent waste has been disposed of by open incineration. At the present time, the uncontrolled release to the atmosphere of the fission products initially contained with the solvent waste is unacceptable and the presence of tributyl phosphate ordinarily forms a corrosive combustion product, at the temperatures required to incinerate the solvent waste, the combustion product being phosphoric acid. Furthermore, such processing of radwastes containing tributyl phosphate also tends to generate a slag or scale comprising a molten phosphorus by-product desposited upon various parts of the incinerator which greatly reduces efficiency. In addition, one or more liquids are brought into existence when tributyl phosphate is present which adhere to the particles of conventional bed materials, destroying the needed fluidization.

The present invention satisfies the long existing need for a satisfactory system for disposing of radioactive wastes involving simultaneous incineration of the waste and chemical neutralization of the phosphorus. The resulting exhaust gas is non-corrosive, which permits the use of efficient exhaust clean up equipment and controls the release of radioactive materials and other pollutants to acceptable levels.

The radwaste and fuel introduced from tanks 50 and 54 into the bed 28 after the operating temperature has been reached and maintained are efficiently oxidized within the bed 28. The phosphorus material contained within the waste 54 is chemically captured or neutralized, the resulting compound comprising calcium phosphate (a dry, stable, solid material with a high melting point in excess of the temperatures generated within the vessel 14 and particularly within the bed 28). The preferred bed operating temperature is on the order of 900° C.

The neutralized phosphorus material in the form of calcium phosphate is removed from the bed 28 preferably by elutriation (caused by the passage of air issuing from the perforations 40 through the bed 28). The elutriated calcium phosphate is carried by the exhaust stream of gas out the duct 16, processed through the previously described cyclone and ultimately deposited in container 126. The accumulated calcium phosphate may be disposed of safely in special radioactive burial grounds or stored for future processing. Incinerators for radioactive organic solvents utilize additional exhaust gas cleaning equipment to meet the regulations pertaining to release of radioactive material to the atmosphere.

From the foregoing description of a radioactive organic solvent incinerator, following incineration, the solid phase comprises spent bed material, ash, and the majority of the radioactivity. The gaseous phase comprises products of combustion, excess air and any volatile radioactive materials. The combustion products including ash, the solid radioactive materials, and the calcium phosphate carried with the gaseous phase pass-through in the described cyclone separator. The solids being separated from the gas are deposited in the storage container 126.

A pilot scale incinerator has been operated to prove the performance of this invention. The pilot incinerator was specifically designed to simulate incineration of organic waste from nuclear fuel reprocessing facilities. The tests were performed, for example, with a mixture of tributyl phosphate and a diluent with no radioactive contaminates in the solvent.

The pilot incinerator was approximately 150 mm in diameter and about 1.8 m high. The pilot incinerator arrangement was as is shown in the FIGURE and included an in-bed heat exchanger. An extensive series of development tests were followed by a process demonstration with over 100 hours of operation. Typical operating conditions for the demonstration are summarized in the following Table.

TABLE

| Bed Temperature | 850. | C ± 100 C. |
|---|---|---|
| Vapor Space Temperature | 750. | C ± 150 C. |
| Organic Solvent Rate | 3. | kg/hr |
| Limestone Bed Feedrate | 2.9 | kg/hr |
| Cyclone Product Rate | 1.6 | kg/hr |
| Fluidizing Air Rate | 0.30 | std m$^3$/min |
| Solvent Injection Air | 0.17 | std m$^3$/min |
| Bed Pneumatic Feeder Air Rate | 0.17 | std m$^3$/min |
| Supply Air Pressure to Jet Grinder | 210–240. | kPa |
| Coolant (water) to In-Bed Heat Exchanger | 0.0057 | m$^3$/hr |

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. An incineration system comprising:
a vessel;
an external source of fuel;
means for introduction of the fuel into the vessel;
means for introduction of air into the vessel adequate to maintain fluidization and support combustion;
an external source of waste comprising phosphorus;
means for introducing the waste comprising phosphorus into the vessel;
an external source of lime, limestone and/or slaked lime;
means for causing the temperature of the fluidized bed to reach and be retained at an elevated level substantially within the range of 750° C. to 950° C. and the temperature of the vapor space to reach and be retained at an elevated level substantially within the range of 600° C. to 900° C.;
a fluidized bed within the vessel wherein the material within the bed at any point in time during operation comprises (a) calcium, (b) phosphorus waste and (c) inert calcium phosphate;
means for promoting the separation of calcium phosphate from the other particles of the bed, said means comprising jet grinding means, means segregating the calcium phosphate from the remainder of the bed and means causing lime, limestone and/or slaked lime to be introduced into the bed.

2. An incineration system according to claim 1 wherein said segregating means comprise an air delivery and exhaust system which removes the calcium phosphate from the remainder of the bed by elutriation or by draining.

* * * * *